D. HILL.
Wheel-Harrow.
No. 10,109.   Patented Oct. 11, 1853.
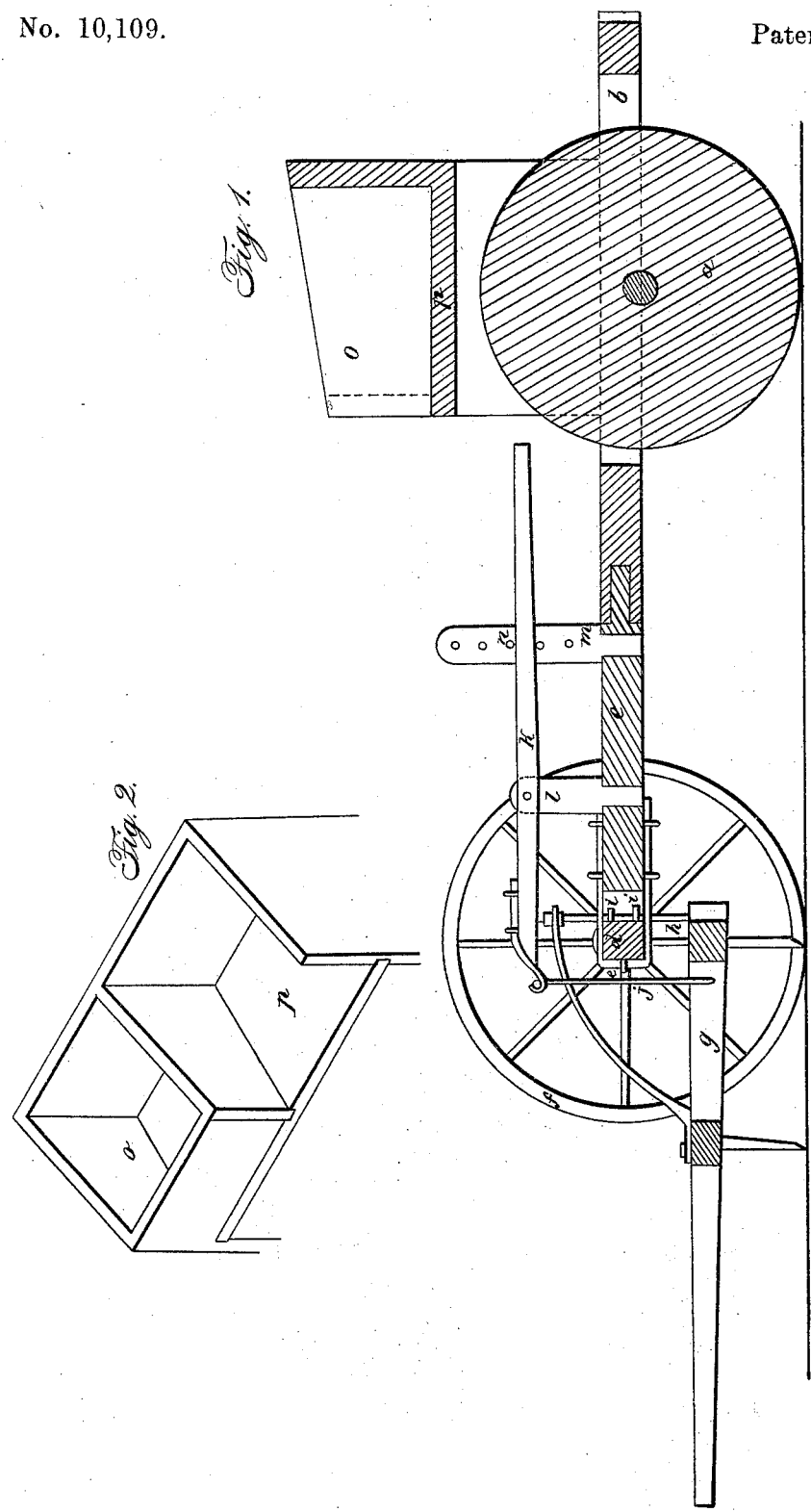

UNITED STATES PATENT OFFICE.

DANIEL HILL, OF BARTONIA, INDIANA.

IMPROVEMENT IN THE ATTACHMENT OF A HARROW TO A LAND-ROLLER.

Specification forming part of Letters Patent No. 10,109, dated October 11, 1853.

*To all whom it may concern:*

Be it known that I, DANIEL HILL, of Bartonia, Randolph county, Indiana, have invented a new and useful Arrangement of Mechanism for Harrowing, Rolling, and Broadcast Sowing at one Operation; and I do hereby declare the following to be a full, clear, and exact description thereof, reference being had to the annexed drawings, making part of this specification, and in which—

Figure 1 is a longitudinal section. Fig. 2 is a perspective view of the driver's seat and the seed-box.

$a$ is a roller whose gudgeons run in a frame, $b$. The coupling-pole $c$ of this frame is pivoted to the rail $d$ by the king-bolt $e$. This rail forms the axle of a pair of wheels, $f$, (one shown,) and these wheels, being connected to the roller-frame by the vertical pivot $l$, as described, are capable of turning to the right or left in the same way as the fore truck of a wagon. To this axle is attached the harrow $g$ in such a way as to allow the latter to accommodate itself to every inequality of ground—that is, by means of rods $h$ projecting upward from the harrow-frame and occupying staples $i$ in the axle. These permit the harrow to rise and fall vertically, or even somewhat irregularly, while any forward draft on the harrow is communicated to the roller also. This harrow is suspended at the desired elevation by means of a rod, $j$, connected to the counter-arm of a treadle, $k$, whose fulcrum $l$ rests on the coupling-pole.

The post $m$, pierced by holes at different heights and provided with a pin, $n$, enables the driver to fix the harrow at any desired height. This is of material value, inasmuch as with different soils and crops a very dissimilar depth of harrowing is desirable; but when the harrow in common use bears with all its weight on the ground it sometimes sinks in too deep, and becoming choked with clods, trash, &c., increases the labor of draft, and also loses some of its efficiency as a harrow.

With my arrangement, whenever it is found desirable to temporarily elevate the harrow, either to rid it of trash, to avoid a plant or stump, or to turn the apparatus round, the object can be immediately accomplished by the driver pressing his foot on the treadle.

The seed-box $o$ and driver's seat $p$ require no particular description.

The importance of getting the seed covered while the ground is moist and friable from having been freshly stirred is very great, and for this reason it is that I have provided a receptacle for the seed which shall be convenient for the hand of the driver; but in addition to this advantage there is of course a saving of time and labor, and consequently an increased facility for selecting the proper weather for the entire operation.

What I claim herein as new and of my invention, and desire to secure by Letters Patent, is—

The arrangement and mode of attaching the harrow to the forward axle of a roller in the manner and for the purpose set forth.

In testimony whereof I have hereunto set my hand before two subscribing witnesses.

DANIEL HILL.

Witnesses:
GEO. H. KNIGHT,
J. H. GETZENDANNER.